June 7, 1960 L. R. RICHARDS 2,939,975
DUAL VOLTAGE AUTOMOBILE GENERATOR
Filed Nov. 30, 1956 2 Sheets-Sheet 1

INVENTOR.
Lawrence R. Richards
BY
ATTORNEYS

June 7, 1960  L. R. RICHARDS  2,939,975
DUAL VOLTAGE AUTOMOBILE GENERATOR

Filed Nov. 30, 1956  2 Sheets-Sheet 2

INVENTOR.
Lawrence R. Richards
BY
McGrew & Edwards
ATTORNEYS

United States Patent Office 2,939,975
Patented June 7, 1960

2,939,975
DUAL VOLTAGE AUTOMOBILE GENERATOR

Lawrence R. Richards, Denver, Colo., assignor to Chapman Brothers, Denver, Colo., a partnership Filed Nov. 30, 1956, Ser. No. 625,310

2 Claims. (Cl. 310—131)

This invention relates to automotive generators, and more particularly to dual-voltage generators in which a single generator driven by an automobile or similar internal combustion engine produces low-voltage direct current capable of providing power for the operation of the engine and electrical accessories of an automobile, and also producing a relatively high-current 110- to 120-volt alternating current for operating commercially-available 110-volt electrical appliances.

The device of the present invention comprises an electric generator having a double-wound rotor journalled for rotation in a housing. One winding, which is the main or heavy winding of the rotor, is connected with a slip ring and grounded on the rotor, and the leads from the brush mounted on the slip ring and the ground from the housing provide 110- to 120-volt alternating current. The rotor primary winding is such as to produce 120 volts (for simplicity the voltage will be assumed to be 120 volts) at a rating of 1200 watts. The secondary winding of the rotor is superimposed on the primary winding and is interconnected with a commutator, leads from which supply either a 6- or 12-volt direct current for the operation of the automobile engine and electrical accessories. A series-connected field is arranged for connection in the regulated electric circuit of the automobile or is shunted across the lead from the commutator to provide the flux for the operation of the generator. The windings of the generator are set for optimum efficiency at about 3600 revolutions per minute of the rotor. The connection between the motor and the generator is such that the 3600 r.p.m. of the generator is produced at slightly above idling speed of the automobile engine. This permits the generator to produce 120-volt current with minimum expenditure of fuel for operating the engine. By providing a voltage regulator for the field, the generator may be operated at substantially higher r.p.m. so that the 120-volt alternating current may be utilized while the automobile is actually in motion. The armature winding of the generator is such that up to about automobile speeds of 30 to 40 miles per hour the 120-volt current may be utilized without damage to the generator or appliance being used. With a voltage regulator in the field circuit, however, a constant voltage may be produced while the generator rotor actually operates at a higher r.p.m.

The generator of the present invention has a very large number of uses since the generator not only produces the alternating current, but also direct current utilized to operate the internal combustion engine to which it is attached. The generator is useful for mounting on automobiles, trucks, tractors, and the like, and also on portable internal combustion engines such as small air-cooled engines, all without the use of a battery as primary field excitation such as normally has been required in prior art generators. As the economy of the American people has expanded, so has the use of electrical equipment, and the generator of the present invention further increases the utility of various electrical appliances which have become common household items. Many electrical appliances would be extremely useful in an automobile or away from a convenient electrical outlet, and the generator of the present invention supplies a ready source of current with a convenient outlet for use with many types of equipment, tools, and the like. With the large overload capacity of the present generator, relatively large motors may be utilized since the overload capacity of the generator permits easy starting of the large motors, while the rated capacity of the generators is sufficient to supply current to the operating motors.

It is, therefore, included among the objects and advantages of the present invention to provide a dual-voltage generator for attachment to an internal combustion engine which produces a commercial source of 110- to 120-volt alternating current and a source of direct current for operating the internal combustion engine and any accessories connected therewith. The generator of the present invention includes series-connected field coils which provide adequate field excitation for producing the alternating current and for producing direct current for the operation of the internal combustion engine to which it is attached and electrical accessories therefore. The generator includes a rotor having a double winding, one winding of which is superimposed on the other on the rotor. One winding produces alternating current and the other winding is used to produce the direct current, both for the operation of the automobile and for the field winding of the generator. The generator is adapted to replace generators offered as original equipment on automotive engines without substantial installation changes and with minimum additional equipment to complete the replacement. The generator as installed provides a low-cost highly efficient mobile source of 120-volt current.

These and other objects and advantages of the present invention may be readily ascertained by referring to the following description and appended illustrations in which.

Figure 1:
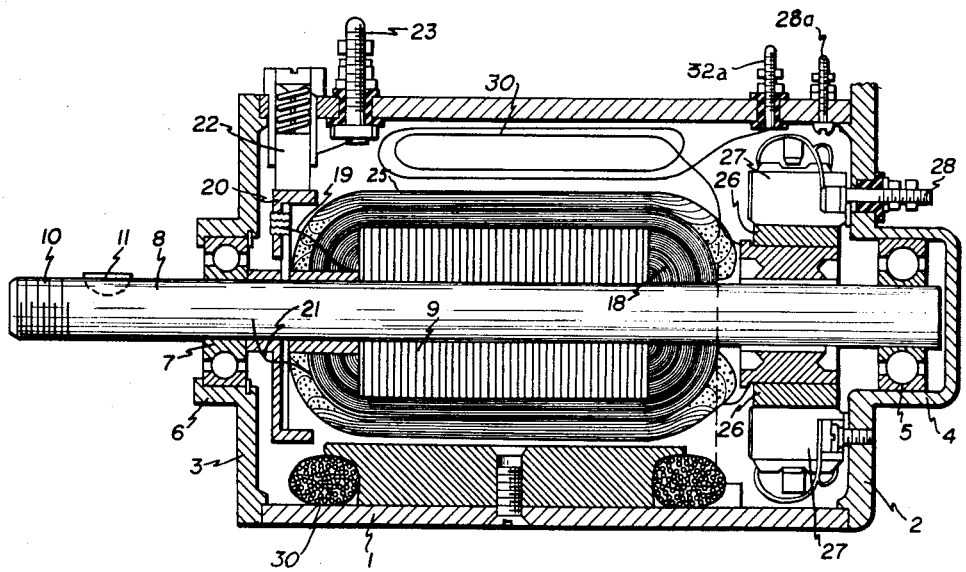
Fig. 1 is a cross-sectional view of a generator according to the invention, showing, in partical schematic form, the construction of a dual-voltage generator according to the invention.

The generator of the invention comprises a housing or shell 1 which in the preferred form is a hollow cylindrical member of about the size of a common automotive generator. The housing 1 is closed at one end by an end portion 2 and at the opposite end by an end 3. The end 2 includes a central projection 4 containing a bearing set 5, and the end 3 includes a boss 6 housing a bearing set 7. A rotor shaft 8 is journalled in the bearings 5 and 7 for rotation, and the shaft 8 is the rotary mounting of the armature of the generator. Laminations 9, which are cut to hold the windings of the generator, are mounted on the shaft 8 in position to hold the coils of the armature internally of the shell. The composition and construction of the laminations are well known in the generator art and further detail or description is not deemed necessary. The shaft 8 is threaded at end 10 and a key 11 is provided for mounting a V-belt pulley 12 and a cooling fan 13 thereon. Mounts 14 and 15 may be utilized for mounting the generator on an automobile engine. The generator may be mounted on an automobile mount in the position of the original generator so that the present generator takes the place of the original equipment of the automobile.

The windings on the armature consist of two sets, one superimposed on the other. The inner winding 18 comprises two coils, each of which consists of three banks of twenty-five turns each so that there are seventy-five turns for each coil and a total of 150 turns. The wire is insulated 16-gauge wire.

One end 19 of the armature winding 18 is interconnected with a slip ring 20 which is mounted for rotation on the shaft 8, and the opposite end of the winding 21 is grounded to the shaft 8. The coils are, of course, insulated from the shaft. A brush set 22 is mounted for slidable engagement with the slip ring and a terminal 23 is interconnected with the brush. The terminal 23 is insulated through the housing 1 and, by providing a terminal 32a connected to the housing, a two-lead line 24 is provided which at optimum r.p.m. of the generator produces 120-volt alternating current in the leads.

The superimposed winding on the armature is the D.C. winding 25 which is superimposed over the A.C. winding 18, and it comprises fourteen coils of two turns each of seventeen-gauge wire. The coils 25 are interconnected with a twenty-eight-bar commutator 26 on which rides a brush set 27. A terminal 28 is interconnected with a lead to the brush set and provides the connection for the hot side of a D.C. line 29. The ground of the line is interconnected with a terminal 28a connected to the housing. The field excitation is produced by a pair of coils 30 connected in series and arranged to be shunted across line 29 by means of a switch 35. When the generator is producing D.C. current, line 29 passing through a voltage regulator 33 provides current for the field. The field coils for a six-volt system must be sufficient for a ten-ampere draw at twenty-eight volts in order to product 120 volts alternating current at an armature speed of 3600 r.p.m. For a twelve-volt system the amperage draw is proportionately increased as is well known in the art. When the generator is drawing only D.C. current for the operation of the internal combustion engine on which it is mounted and the electrical accessories thereto, there is no draw on the A.C. line and the field excitation voltage is controlled by the voltage regulator 33 leading to a battery 31.

Figure 2:
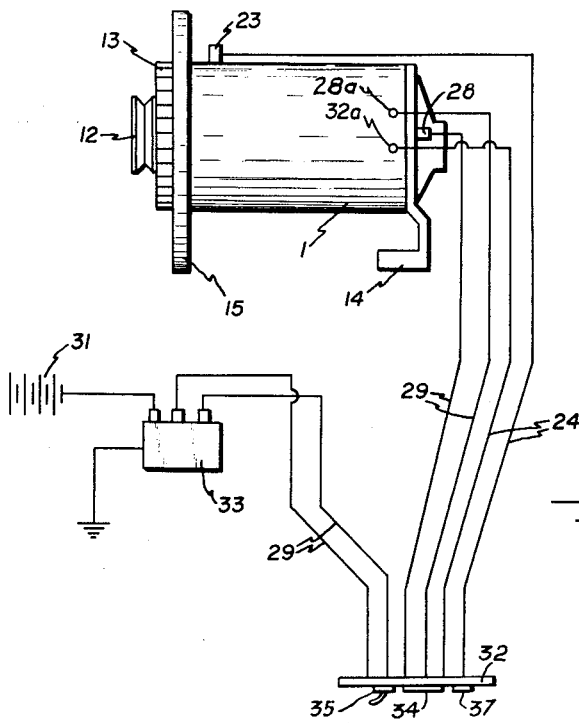
Fig. 2 is a partial schematic wiring diagram of a generator for connection to an internal combustion engine.
Figure 3:
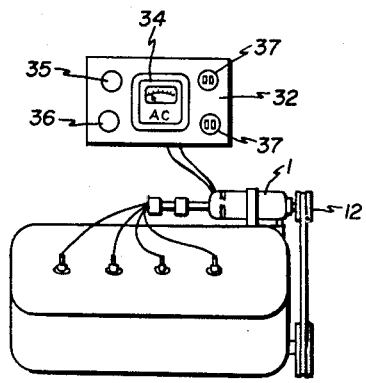
Fig. 3 is a schematic illustration of a generator according to the invention mounted on an internal combustion engine and connected to a control panel which is arranged to be mounted on a portion of the automobile.
Figure 4:
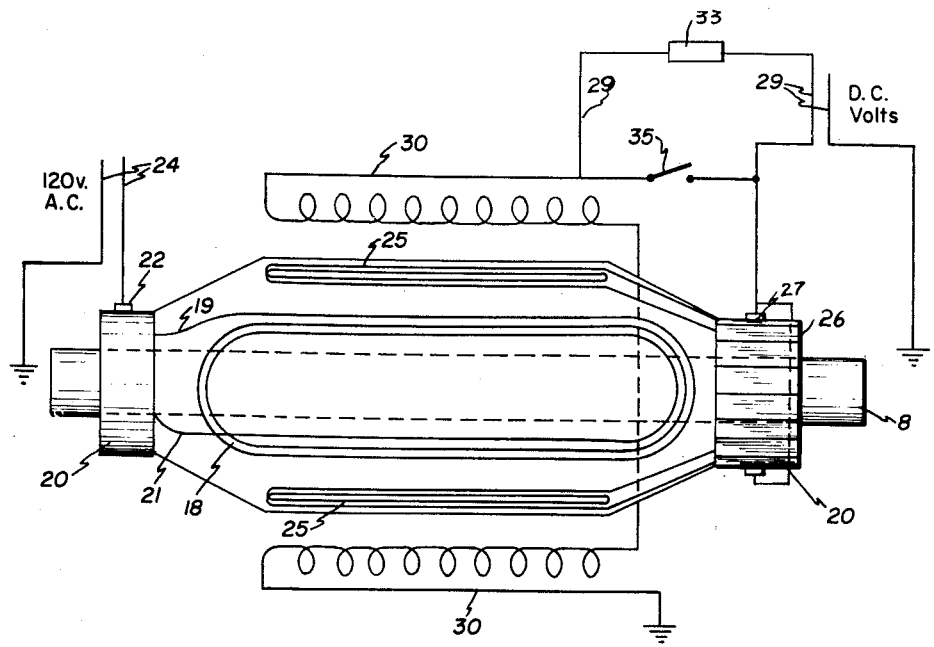
Fig. 4 is a schematic wiring diagram of the generator of the invention.

The leads 24 and 29 are mounted through a control panel 32, the positioning of which is indicated schematically in Fig. 2, which includes a volt meter 34, a toggle switch 35 to shunt out the voltage regulator for increasing field excitation when it is desired to produce correct alternating current as shown by the volt meter 34. A pilot light 36 indicates the operation of the 120-volt system. The alternating current leads 24 are connected through female two-prong outlet receptacles 37 mounted on the control panel 32.

With the armature winding of the generator as set forth above, at 3600 r.p.m. and with the field shunted across the commutator, generator produces an alternating current of 120 volts. At no load the D.C. voltage of the field is 26 volts at 8.2 amps. At 1200 watts load the voltage of the field increases to 28 volts at 10 amps., the armature r.p.m. being 3600 and the alternating current produced being 120 volts. In each case, the current is sixty cycle. When the field is not shunted across the D.C. line, the field current and voltage is controlled by the regulator 33 which is connected in the line between the battery and the generator, so that the generator will produce six or twelve volts, depending on the electrical system of the particular engine.

By using a dynamic regulator, as for example a carbon-disc pressure-controlled regulator operated by a solenoid valve, as a series-connected regulator with the field, the field voltage and consequently the A.C. voltage may be closely regulated even though the armature speed varies. In this case, the automobile regulator controls the voltage of the current to the engine, the battery and the electrical accessories, while the series-connected carbon-disc regulator controls the voltage of the field windings so that the generator may be used to produce simultaneously 120-volt alternating current and six- or twelve-volt direct current. This permits the generator to be used as 120-volt generator when the automobile is travelling at all rates of speed.

During the operation of the generator as shown, the toggle switch 35 is placed in the 110-volt generator position and the engine of the automobile is started and brought up to a speed where the volt meter 34 indicates 120 volts. Electrical equipment is then plugged into the receptacles 37. During this operation the pilot light 36 indicates that the generator is set for 120-volt operation. If a voltage regulator is placed in the shunted field line, the operation is the same except that there is no need for a toggle switch to shunt across the direct current line and the generator will operate to produce both alternating and direct current simultaneously. Under these conditions, so long as there is no load on the line, there is no current passing through the 120-volt alternating current circuit, but the D.C. side of the generator is operating as a standard generator to produce current for the operation of the automobile.

In one preferred system, all the terminals of the generator are placed in a multiple-pronged receptacle, as for example a four-prong receptacle, and the female part of the receptacle is secured in the case and all the leads from the D.C. circuit and the A.C. circuit are connected in the female receptacle. All the leads to the control box are, likewise, connected in a four-prong female receptacle mounted on the control box. By providing a web of lines having a male five-prong connector attached to each end thereof, a very simple installation is provided. In this case, the conventional generator is removed from the automobile and the leads to the generator are taped off and secured to the body of the automobile. The generator of the invention is mounted in its place on a motor 40 and the control panel is mounted on the dashboard of the automobile. The web with the male connectors on each end thereof are then inserted in the female receptacles of each unit completing the circuit. The lead lines from the D.C. line are attached from the control panel to the regulator 33 completing the circuit. Any type of known throttle control mechanism may be provided to regulate the speed of the motor during the operation of the generator for the A.C. current. With this circuit set up, the generator supplies current for the operation of the automobile and also for the 120-volt 60-cycle alternating current outlets, and at a rated capacity of 1200 watts, the generator will last indefinitely.

While the invention has been described by reference to a particular device, there is no intent to limit the scope or the spirit of the invention to the precise details so illustrated except insofar as set forth in the following claims.

I claim:

1. In an electric supply system for a vehicle or the like having an internal combustion engine, a combination generator for producing low voltage direct current for the vehicle system and alternating current at standard voltage for other equipment, said generator comprising a stator having a field winding thereon and a rotor having independent first and second windings thereon, means including a commutator and brush assembly for utilizing said first winding to produce direct current, means including a slip ring and brush assembly and output terminals for utilizing said second winding to produce alternating current, a regulator for maintaining substantially constant the voltage of the direct current supplied to the vehicle system, and selectively operable control means movable to a first position for connecting said first winding and brush assembly to said regulator for supplying direct current at a predetermined voltage to the vehicle system and movable to a second position for rendering said regulator ineffective and to connect said first winding and brush assembly directly with said field winding for supplying alternating current at a standard voltage at said output terminals.

2. In an electric supply system for a vehicle or the like having an internal combustion engine, a combination generator as set forth in claim 1 wherein said selectively operable control means includes a switch connected across the terminals of said regulator for shunting out the regulator in said second position of said control means.

References Cited in the file of this patent

UNITED STATES PATENTS

| | | |
|---|---|---|
| Re. 23,351 | Fell | Apr. 3, 1951 |
| 239,313 | Brush | Mar. 29, 1881 |
| 405,263 | Lemp | June 18, 1889 |
| 525,447 | Dahl | Sept. 4, 1894 |
| 1,220,255 | Merrill | Mar. 27, 1917 |
| 1,262,587 | Jepson | Apr. 9, 1918 |
| 1,802,110 | Graham | Apr. 21, 1931 |
| 1,895,379 | Dudick | Jan. 24, 1933 |